United States Patent
Wang et al.

(10) Patent No.: US 11,546,104 B2
(45) Date of Patent: Jan. 3, 2023

(54) COMMUNICATIONS METHOD, DEVICE, AND SYSTEM

(71) Applicant: HUAWEI TECHNOLOGIES CO., LTD., Guangdong (CN)

(72) Inventors: Hong Wang, Beijing (CN); Li Chai, Shenzhen (CN); Jian Zhang, Shenzhen (CN); Zheng Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 37 days.

(21) Appl. No.: 16/992,992

(22) Filed: Aug. 13, 2020

(65) Prior Publication Data
US 2020/0374076 A1     Nov. 26, 2020

Related U.S. Application Data

(63) Continuation of application No. PCT/CN2018/076834, filed on Feb. 14, 2018.

(51) Int. Cl.
*H04L 5/00* (2006.01)
*H04W 24/10* (2009.01)
(Continued)

(52) U.S. Cl.
CPC ........... *H04L 5/0048* (2013.01); *H04W 24/10* (2013.01); *H04W 36/04* (2013.01); *H04W 72/0453* (2013.01)

(58) Field of Classification Search
CPC . H04W 48/02; H04W 72/0453; H04W 24/10; H04W 36/04; H04W 48/18;
(Continued)

(56) References Cited

U.S. PATENT DOCUMENTS 8,897,182 B2    11/2014   Yoon et al.
9,201,134 B1 *  12/2015   Lee .................... G01S 5/10
(Continued)

FOREIGN PATENT DOCUMENTS

| CN | 101848538 A | 9/2010 |
| CN | 103299680 A | 9/2013 |
| CN | 106102174 A | 11/2016 |

OTHER PUBLICATIONS

Huawei et al., "Introduction of Lower UE power class for Rel-15 MTC", 3GPP TSG RAN WG2 Meeting #100, R2-1713123, Reno, USA, Nov. 27-Dec. 1, 2017, total 24 pages.
(Continued)

*Primary Examiner* — Man U Phan
(74) *Attorney, Agent, or Firm* — Womble Bond Dickinson (US) LLP

(57) ABSTRACT

Embodiments of this disclosure provide a communications method, device, and system. The method includes: generating cell selection information, where the cell selection information is associated with a configuration parameter of a reference signal of a cell; and sending the cell selection information. In the embodiments of this disclosure, the cell selection information associated with the configuration parameter of the reference signal of the cell is generated and sent, so that a terminal can perform cell selection based on the cell selection information. Therefore, terminals supporting different reference signal configurations can be deployed in a network.

21 Claims, 4 Drawing Sheets

(51) Int. Cl.
*H04W 36/04* (2009.01)
*H04W 72/04* (2009.01)

(58) Field of Classification Search
CPC .... H04W 48/12; H04W 72/04; H04L 5/0053; H04L 5/0048; H04L 5/00
USPC ........................................................ 370/252
See application file for complete search history.

(56) References Cited

U.S. PATENT DOCUMENTS

| | | | |
|---|---|---|---|
| 10,390,331 B2* | 8/2019 | Adjakple | H04W 48/00 |
| 10,419,990 B2* | 9/2019 | Uemura | H04W 24/08 |
| 10,560,237 B2* | 2/2020 | Zaki | H04W 72/085 |
| 10,588,064 B2* | 3/2020 | Zhang | H04W 74/0833 |
| 10,904,821 B2* | 1/2021 | Chen | H04W 48/02 |
| 11,006,347 B2* | 5/2021 | Kadiri | H04L 5/0091 |
| 11,160,009 B2* | 10/2021 | Tao | H04W 74/0833 |
| 2013/0237347 A1* | 9/2013 | Icim | A63B 67/20 473/423 |
| 2015/0237668 A1* | 8/2015 | Kim | H04W 36/36 370/331 |
| 2016/0119893 A1* | 4/2016 | Chen | H04W 68/005 370/328 |
| 2016/0269940 A1 | 9/2016 | Takeda et al. | |
| 2017/0290018 A1 | 10/2017 | Darwood et al. | |
| 2017/0311290 A1 | 10/2017 | Adjakple et al. | |
| 2017/0339660 A1* | 11/2017 | Kazmi | H04W 64/003 |
| 2019/0059045 A1* | 2/2019 | Huang-Fu | H04W 48/12 |
| 2019/0230579 A1* | 7/2019 | Charbit | H04W 48/12 |
| 2020/0228269 A1* | 7/2020 | Zhang | H04W 76/27 |
| 2020/0275522 A1* | 8/2020 | Chervyakov | H04W 76/27 |
| 2021/0045123 A1* | 2/2021 | Yavuz | H04L 5/0048 |
| 2021/0226760 A1* | 7/2021 | Ye | H04L 5/0007 |
| 2021/0250846 A1* | 8/2021 | Ohlsson | H04W 48/02 |
| 2021/0321307 A1* | 10/2021 | Shih | H04W 36/0072 |

OTHER PUBLICATIONS

Ericsson, "5G indicator for EN-DC", 3GPP TSG-RAN WG2 #100, Tdoc R2-1713443, Reno, Nevada, USA, Nov. 27-Dec. 1, 2017, total 19 pages.

Vivo, BWP impacton idle/inactive mode. 3GPP TSG-RAN WG2 Meeting #100, Reno, USA, Nov. 27 Dec. 1, 2017, R2-1712759, 2 pages.

3GPP TS 36.304 V14.5.0:"3rd Generation Partnership Project;Technical Specification Group Radio Access Network; Evolved Universal Terrestrial Radio Access (E-UTRA); User Equipment (UE) procedures in idle mode(Release 14)",Dec. 2017,total 49 pages.

3GPP TS 36.331 V15.0.1:"3rd Generation Partnership Project;Technical Specification Group Radio Access Network; Evolved Universal Terrestrial Radio Access (E-UTRA);Radio Resource Control (RRC);Protocol specification(Release 15)",Jan. 2018,total 776 pages.

3GPP TSG RAN WG2 Meeting #100 R2-1713127,On CRS muting for BL UEs,Huawei, HiSilicon,Reno, USA, Nov. 27 Dec. 1, 2017,total 3 pages.

3GPP TS 36.133 V14.6.0:"3rd Generation Partnership Project;Technical Specification Group Radio Access Network; Evolved Universal Terrestrial Radio Access (E-UTRA);Requirements for support of radio resource management (Release 14)",Dec. 2017,total 2966 pages.

* cited by examiner

COMMUNICATIONS METHOD, DEVICE, AND SYSTEM

CROSS-REFERENCE TO RELATED APPLICATIONS

This application is a continuation of International Application No. PCT/CN2018/076834, filed on Feb. 14, 2018, which is hereby incorporated by reference in its entirety.

TECHNICAL FIELD

This disclosure relates to the field of wireless communications technologies, and in particular, to a communications method, device, and system.

BACKGROUND

With continuous development of wireless communications technologies, more and more functions related to cell reference signal configurations emerge, for example, a cell reference signal muting function.

In the prior art, a narrowband terminal operates only on relatively narrow bandwidth. If there are only narrowband terminals in some cells, it is unnecessary to send a reference signal on entire system bandwidth. Sending the reference signal on the entire system bandwidth increases radio resource consumption and increases power consumption of a base station. Sending of the reference signal also causes interference to a neighboring cell. In view of this, a reference signal muting method is proposed, so that the reference signal may be sent only on relatively narrow bandwidth. However, not all terminals can support these different cell reference signal configurations.

Therefore, in the prior art, how to deploy, in a network, terminals in the network that support different reference signal configurations becomes an urgent problem to be resolved currently.

SUMMARY

Embodiments of this disclosure provide a communications method, device, and system, to resolve a prior-art problem of how to deploy, in a network, terminals in the network that support different reference signal configurations.

One embodiment of this disclosure provides a communications method, including: generating cell selection information, where the cell selection information is associated with a configuration parameter of a reference signal of a cell; and sending the cell selection information. The cell selection information is used by a terminal to perform cell selection.

In the foregoing solution, the cell selection information associated with the configuration parameter of the reference signal of the cell is generated and sent, so that the terminal can perform cell selection based on the cell selection information. Therefore, terminals supporting different reference signal configurations can be deployed in a network.

In one embodiment, the cell selection information includes at least one of the following:

cell barred indicators, information about a state of a reference signal muting function, or information about offsets of a cell selection threshold.

In one embodiment, the cell barred indicators include a first barred indicator and a second barred indicator; and the first barred indicator is used to indicate whether a first-type terminal can select the cell, the second barred indicator is used to indicate whether a second-type terminal can select the cell, and the first-type terminal and the second-type terminal use different configuration parameters of the reference signal.

In one embodiment, the cell barred indicators include the first barred indicator used to indicate whether the first-type terminal can select the cell and the second barred indicator used to indicate whether the second-type terminal can select the cell. In this way, whether the first-type terminal and the second-type terminal that use different configuration parameters of the reference signal can select the cell may be controlled based on the configuration parameters of the reference signal of the cell.

In one embodiment, the state of the reference signal muting function includes any one of the following: enabled, disabled, or unsupported.

In one embodiment, the offsets include a first offset and a second offset; and the first offset is an offset, of the cell selection threshold, that is used by a first-type terminal, the second offset is an offset, of the cell selection threshold, that is used by a second-type terminal, and the first-type terminal and the second-type terminal use different configuration parameters of the reference signal.

In one embodiment, the offsets include the first offset, of the cell selection threshold, that is used by the first-type terminal and the second offset, of the cell selection threshold, that is used by the second-type terminal. In this way, the offsets of the cell selection threshold that are used by the terminals that use different configuration parameters of the reference signal may be controlled based on requirements.

In one embodiment, the configuration parameter includes at least one of the following: a configuration bandwidth, configuration duration, or a configuration periodicity.

In one embodiment, the configuration bandwidth may be a bandwidth of the reference signal of the cell, the configuration duration may be duration for sending the reference signal of the cell, and the configuration periodicity may be a periodicity length for sending the reference signal of the cell.

In one embodiment, the cell includes a serving cell and/or a neighboring cell.

In one embodiment, the serving cell may be a cell on which the terminal camps, and is a cell to which the terminal may establish a communication connection; or the serving cell may be a cell to which the terminal has established a communication connection. The neighboring cell is a cell neighboring to the serving cell or the camped cell.

One embodiment of this disclosure provides a communications method, including:

receiving cell selection information that is sent by a network device and that is associated with a configuration parameter of a reference signal of a cell, and performing cell selection based on the cell selection information, where the cell selection information is used by a terminal to perform cell selection.

In one embodiment, the cell selection information that is sent by the network device and that is associated with the configuration parameter of the reference signal of the cell is received, and cell selection is performed based on the cell selection information. Therefore, terminals supporting different reference signal configurations can be deployed in a network.

In one embodiment, the cell selection information includes at least one of the following:

cell barred indicators, information about a state of a reference signal muting function, or information about offsets of a cell selection threshold.

In one embodiment, the receiving cell selection information sent by a network device and the performing cell selection based on the cell selection information include:

receiving a first barred indicator in the cell barred indicators sent by the network device, and performing cell selection based on the first barred indicator; and/or receiving, by the terminal, a second barred indicator in the cell barred indicators sent by the network device, and performing cell selection based on the second barred indicator.

In one embodiment, the terminal may perform cell selection based on the first barred indicator and/or the second barred information in the cell barred indicators.

In one embodiment, the cell selection information includes the information about the state of the reference signal muting function, and the state of the reference signal muting function includes any one of the following: enabled, disabled, or unsupported.

In one embodiment, the receiving cell selection information sent by a network device and the performing cell selection based on the cell selection information include:

receiving the information, about the state of the reference signal muting function, that is sent by the network device, and determining, based on the state of the reference signal muting function, whether the cell can be selected.

In one embodiment, for one terminal, the state of the reference signal muting function may indicate a state of the cell. For example, for a first-type terminal, when the state of the reference signal muting function is enabled, it may indicate that the state of the cell is "not barred". In this case, the first-type terminal may determine, based on the state of the reference signal muting function, that the cell can be selected.

In one embodiment, the cell selection information includes the information about the offsets of the cell selection threshold, and the receiving cell selection information sent by a network device and the performing cell selection based on the cell selection information include:

receiving the information, about the offset of the cell selection threshold, that is sent by the network device, calculating a parameter in a cell selection criterion based on the offset, and performing cell selection by using the parameter.

In one embodiment, the offset may be directly used to calculate the parameter in the cell selection criterion, or a parameter that may be used to calculate the parameter in the cell selection criterion may be obtained based on the offset and the state of the reference signal muting function of the cell.

In one embodiment, the cell is a serving cell, and the calculating a parameter in a cell selection criterion based on the offset includes:

calculating a parameter $R_s$ in the cell selection criterion based on the offset Qoffset1, where the calculation meets the following formula:

$$R_s = Q_{meas,\ s} + Q\text{offset1} + Q\text{temp1}, \text{ where}$$

$Q_{meas,\ s}$ represents a reference signal received power or reference signal received quality of the serving cell, and Qtemp1 represents another offset.

In one embodiment, the cell is a neighboring cell, and the calculating a parameter in a cell selection criterion based on the offset includes:

calculating a parameter $R_n$ in the cell selection criterion based on the offset Qoffset1, where the calculation meets the following formula:

$$R_n = Q_{meas,\ n} + Q\text{offset1} + Q\text{temp2}, \text{ where}$$

$Q_{meas,\ n}$ represents a reference signal received power or reference signal received quality of the neighboring cell, and Qtemp2 represents another offset.

In one embodiment, the offsets include a first offset and a second offset; and the receiving cell selection information sent by a network device and the performing cell selection based on the cell selection information include: receiving information that is about the first offset or the second offset and that is sent by the network device, calculating the parameter in the cell selection criterion based on the first offset or the second offset, and performing cell selection by using the parameter.

One embodiment of this disclosure provides a communications method, including: determining a first bandwidth and a second bandwidth, and sending information about the first bandwidth and information about the second bandwidth, where the first bandwidth is a system bandwidth of a cell.

One embodiment of this disclosure provides a communications method, including: receiving information about a first bandwidth and information about a second bandwidth that are sent by a network device, where the first bandwidth is a system bandwidth of a cell, and the second bandwidth is a configuration bandwidth of a reference signal of the cell; and determining the system bandwidth of the cell based on the information about the first bandwidth; and determining the configuration bandwidth of the reference signal of the cell based on the information about the second bandwidth.

One embodiment of this disclosure provides a communications device, including: a processing unit, configured to generate cell selection information, where the cell selection information is associated with a configuration parameter of a reference signal of a cell; and a sending unit, configured to send the cell selection information. The cell selection information is used by a terminal to perform cell selection.

In one embodiment, the cell selection information includes at least one of the following:

cell barred indicators, information about a state of a reference signal muting function, or information about offsets of a cell selection threshold.

In one embodiment, the cell barred indicators include a first barred indicator and a second barred indicator; and the first barred indicator is used to indicate whether a first-type terminal can select the cell, the second barred indicator is used to indicate whether a second-type terminal can select the cell, and the first-type terminal and the second-type terminal use different configuration parameters of the reference signal.

In one embodiment, the state of the reference signal muting function includes any one of the following: enabled, disabled, or unsupported.

In one embodiment, the offsets include a first offset and a second offset; and the first offset is an offset, of the cell selection threshold, that is used by a first-type terminal, the second offset is an offset, of the cell selection threshold, that is used by a second-type terminal, and the first-type terminal and the second-type terminal use different configuration parameters of the reference signal.

In one embodiment, the configuration parameter includes at least one of the following:

a configuration bandwidth, configuration duration, or a configuration periodicity.

In one embodiment, the cell includes a serving cell and/or a neighboring cell.

Different embodiments may provide beneficial effects that may also be provided in other embodiments. Details are not described herein again.

One embodiment of this disclosure provides a communications device, including:

a receiving unit, configured to receive cell selection information sent by a network device, where the cell selection information is associated with a configuration parameter of a reference signal of a cell; and a processing unit, configured to perform cell selection based on the cell selection information.

The cell selection information is used by a terminal to perform cell selection.

In one embodiment, the cell selection information includes at least one of the following:

cell barred indicators, information about a state of a reference signal muting function, or information about offsets of a cell selection threshold.

In one embodiment, that the receiving unit receives the cell selection information sent by the network device and the processing unit performs cell selection based on the cell selection information specifically includes:

The receiving unit receives a first barred indicator in the cell barred indicators sent by the network device, and the processing unit performs cell selection based on the first barred indicator; and/or the receiving unit receives a second barred indicator in the cell barred indicators sent by the network device, and the processing unit performs cell selection based on the second barred indicator.

In one embodiment, the cell selection information includes the information about the state of the reference signal muting function, and the state of the reference signal muting function includes any one of the following: enabled, disabled, or unsupported.

In one embodiment, that the receiving unit receives the cell selection information sent by the network device and the processing unit performs cell selection based on the cell selection information specifically includes:

The receiving unit receives the information, about the state of the reference signal muting function, that is sent by the network device, and the processing unit determines, based on the state of the reference signal muting function, whether the cell can be selected.

In one embodiment, the cell selection information includes the information about the offsets of the cell selection threshold, and that the receiving unit receives the cell selection information sent by the network device and the processing unit performs cell selection based on the cell selection information specifically includes:

The receiving unit receives the information, about the offset of the cell selection threshold, that is sent by the network device, and the processing unit calculates a parameter in a cell selection criterion based on the offset, and performs cell selection by using the parameter.

In one embodiment, the cell is a serving cell, and that the processing unit calculates the parameter in the cell selection criterion based on the offset specifically includes:

The processing unit calculates a parameter $R_s$ in the cell selection criterion based on the offset Qoffset1, where the calculation meets the following formula:

$$R_s = Q_{meas,\,s} + Q\text{offset1} + Q\text{temp1, where}$$

$Q_{meas,\,s}$ represents a reference signal received power or reference signal received quality of the serving cell, and Qtemp1 represents another offset.

In one embodiment, the cell is a neighboring cell, and that the processing unit calculates the parameter in the cell selection criterion based on the offset specifically includes:

The processing unit calculates a parameter $R_n$ in the cell selection criterion based on the offset Qoffset1, where the calculation meets the following formula:

$$R_n = Q_{meas,\,n} + Q\text{offset1} + Q\text{temp2, where}$$

$Q_{meas,\,n}$ represents a reference signal received power or reference signal received quality of the neighboring cell, and Qtemp2 represents another offset.

In one embodiment, the offsets include a first offset and a second offset; and that the receiving unit receives the cell selection information sent by the network device and the processing unit performs cell selection based on the cell selection information specifically includes: The receiving unit receives information that is about the first offset or the second offset and that is sent by the network device, and the processing unit calculates the parameter in the cell selection criterion based on the first offset or the second offset, and performs cell selection by using the parameter.

Different embodiments may provide beneficial effects that may also be provided in other embodiments. Details are not described herein again.

According to a seventh aspect, an embodiment of this disclosure provides a communications device, including: a processing unit, configured to determine a first bandwidth and a second bandwidth, where the first bandwidth is a system bandwidth of a cell, and the second bandwidth is a configuration bandwidth of a reference signal of the cell; and a sending unit, configured to send information about the first bandwidth and information about the second bandwidth.

Different embodiments may provide beneficial effects that may also be provided in other embodiments. Details are not described herein again.

One embodiment of this disclosure provides a communications device, including:

a receiving unit, configured to receive information about a first bandwidth and information about a second bandwidth that are sent by a network device, where the first bandwidth is a system bandwidth of a cell, and the second bandwidth is a configuration bandwidth of a reference signal of the cell; and a processing unit, configured to determine the system bandwidth of the cell based on the information about the first bandwidth, where the processing unit is further configured to determine the configuration bandwidth of the reference signal of the cell based on the information about the second bandwidth.

Different embodiments may provide beneficial effects that may also be provided in other embodiments. Details are not described herein again.

One embodiment of this disclosure provides a communications device, including a processor, a memory, and a communications interface, where the processor controls transmit and receive actions of the communications interface;

the memory stores a program; and the processor invokes the program stored in the memory, to perform the method according to any design of the first aspect.

Different embodiments may provide beneficial effects that may also be provided in other embodiments. Details are not described herein again.

One embodiment of this disclosure provides a communications device, including a processor, a memory, and a communications interface, where the processor controls transmit and receive actions of the communications interface;

the memory stores a program; and the processor invokes the program stored in the memory, to perform the method according to any design of the second aspect.

Different embodiments may provide beneficial effects that may also be provided in other embodiments. Details are not described herein again.

One embodiment of this disclosure provides a communications device, including:

the processor controls transmit and receive actions of the communications interface;

the memory stores a program; and the processor invokes the program stored in the memory, to perform the method according to the third aspect.

Different embodiments may provide beneficial effects that may also be provided in other embodiments. Details are not described herein again.

One embodiment of this disclosure provides a communications device, including a processor, a memory, and a communications interface, where the processor controls transmit and receive actions of the communications interface;

the memory stores a program; and the processor invokes the program stored in the memory, to perform the method according to the fourth aspect.

Different embodiments may provide beneficial effects that may also be provided in other embodiments. Details are not described herein again.

One embodiment of this disclosure provides a communications system, including the network device according to the ninth aspect and the terminal according to the tenth aspect.

One embodiment of this disclosure provides a communications system, including the network device according to the eleventh aspect and the terminal according to the twelfth aspect.

One embodiment of this disclosure provides a storage medium. The storage medium stores a computer program; when the computer program is executed by a processor, the method according to any design of the first aspect is implemented.

One embodiment of this disclosure further provides a program product. The program product includes a computer program (namely, an executable instruction), and the computer program is stored in a readable storage medium. At least one processor of a network device may read the computer program from the readable storage medium, and the at least one processor executes the computer program to enable the network device to implement the method provided in the first aspect.

One embodiment of this disclosure provides a storage medium. The storage medium stores a computer program; when the computer program is executed by a processor, the method according to any design of the second aspect is implemented.

One embodiment of this disclosure further provides a program product. The program product includes a computer program (namely, an executable instruction), and the computer program is stored in a readable storage medium. At least one processor of a terminal may read the computer program from the readable storage medium, and the at least one processor executes the computer program to enable the terminal to implement the method provided in the second aspect.

One embodiment of this disclosure provides a storage medium. The storage medium stores a computer program; when the computer program is executed by a processor, the method according to the third aspect is implemented.

One embodiment of this disclosure further provides a program product. The program product includes a computer program (namely, an executable instruction), and the computer program is stored in a readable storage medium. At least one processor of a network device may read the computer program from the readable storage medium, and the at least one processor executes the computer program to enable the network device to implement the method provided in the third aspect.

One embodiment of this disclosure provides a storage medium. The storage medium stores a computer program; when the computer program is executed by a processor, the method according to the fourth aspect is implemented.

One embodiment of this disclosure further provides a program product. The program product includes a computer program (namely, an executable instruction), and the computer program is stored in a readable storage medium. At least one processor of a terminal may read the computer program from the readable storage medium, and the at least one processor executes the computer program to enable the terminal to implement the method provided in the fourth aspect.

DESCRIPTION OF EMBODIMENTS

Figure 1A:
FIG. 1A is a first schematic diagram of an application scenario according to an embodiment of this disclosure.

A communications method, device, and system provided in the embodiments of this disclosure may be applied to a scenario in which a function related to cell reference signal configurations is used. As shown in FIG. 1A, an application architecture in the embodiments of this disclosure may include a terminal and a network device, and a communication connection may be established between the terminal and the network device. In an implementation, the network device may support the function related to the cell reference signal configurations, and may generate cell selection information associated with a configuration parameter of a reference signal and send the cell selection information. The terminal may perform cell selection based on the cell selection information sent by the network device. In another implementation, the network device generates and determines a first bandwidth and a second bandwidth, where the first bandwidth is a system bandwidth of a cell, the second bandwidth is a configuration bandwidth of a reference signal of the cell, and the network device sends information about the first bandwidth and information about the second bandwidth. A first-type terminal determines the system bandwidth of the cell based on the information about the first bandwidth, and determines the configuration bandwidth of the reference signal of the cell based on the information about the second bandwidth.

The terminal may also be referred to as user equipment (UE), and may include but is not limited to an internet device such as a smartphone (such as an Android mobile phone or an iOS mobile phone), a multimedia device, a streaming media device, a personal computer, a tablet computer, a palmtop computer, a mobile internet device (MID), or a wearable intelligent device.

The network device may include a base station. The base station may be a base transceiver station (BTS) in a GSM system, or may be a NB (NodeB) in a WCDMA system, or may be an evolved NodeB (eNB) in LTE, or may be a base station referred to as a 5G base station (e.g., gNodeB, gNB, etc.) in a fifth generation (5G) mobile communications system (also referred to as new radio (NR)), or may be a relay station, or may be a vehicle-mounted device, a wearable device, an access network device in a future 5G network, an access network device in a future evolved public land mobile network (PLMN) network, or the like. This is not limited in this disclosure.

Figure 1B:
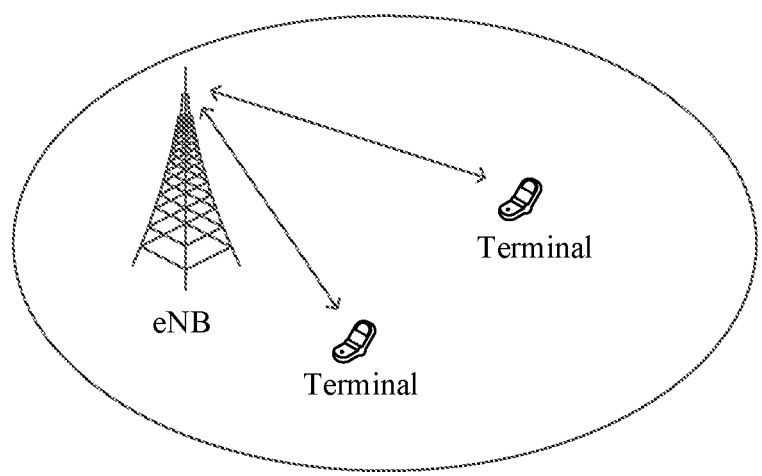
FIG. 1B is a second schematic diagram of an application scenario according to an embodiment of this disclosure.

An example in which the base station is an eNB is used. The application architecture in the embodiments of this disclosure may be that shown in FIG. 1B. Herein, the eNB is the foregoing network device.

Figure 1C:
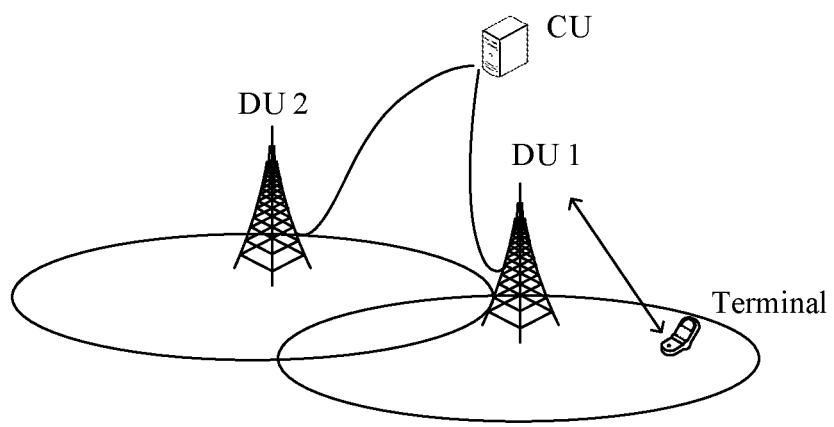
FIG. 1C is a third schematic diagram of an application scenario according to an embodiment of this disclosure.

An example in which the base station is a gNB is used. The application architecture in the embodiments of this disclosure may be that shown in FIG. 1C. Some functions of the base station are on a distributed unit (DU), and some functions are on a centralized unit (CU). A plurality of DUs may be connected to a same CU. Herein, a DU 1 and a DU 2 each are the foregoing network device.

It should be noted that, in the embodiments of this disclosure, the following example is used: The network device sends the information about the first bandwidth and the information about the second bandwidth or the cell selection information, and the terminal receives the information about the first bandwidth and the information about the second bandwidth or the cell selection information sent by the network device.

Specific embodiments are used below to describe in detail the technical solutions of this disclosure. The following several specific embodiments may be combined with each other, and a same or similar concept or process may not be described repeatedly in some embodiments.

Figure 2:
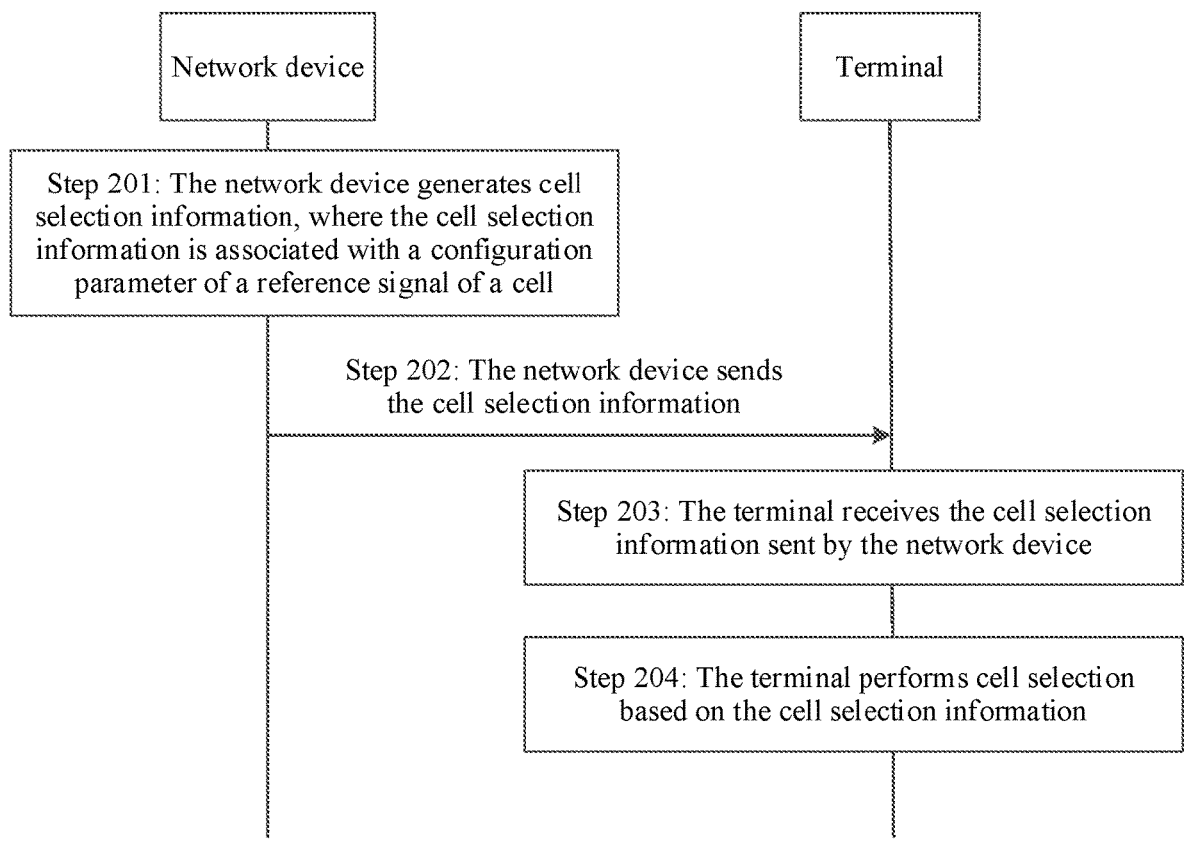
FIG. 2 is a flowchart of a first embodiment of a communications method according to an embodiment of this disclosure.

FIG. 2 is a flowchart of a first embodiment of a communications method according to an embodiment of this disclosure. As shown in FIG. 2, the method in this embodiment may include the following blocks.

Block 201: A network device generates cell selection information, where the cell selection information is associated with a configuration parameter of a reference signal of a cell.

In this block, the cell selection information is used by a terminal to perform cell selection. The reference signal of the cell may be understood as a cell-level reference signal, for example, a cell-specific reference signal (CRS). That the cell selection information is associated with the configuration parameter of the reference signal of the cell may be specifically that: The cell selection information is determined based on the configuration parameter of the reference signal of the cell; or the corresponding cell selection information may change when the configuration parameter of the reference signal of the cell changes. It should be noted that the cell selection information may alternatively be related to another parameter other than the configuration parameter of the reference signal. This is not limited in this disclosure. The cell selection includes: The terminal selects the cell for the first time and/or the terminal reselects the cell.

Optionally, the cell includes a serving cell and/or a neighboring cell. The serving cell may be a cell on which the terminal camps, and is a cell to which the terminal may establish a communication connection; or the serving cell may be a cell to which the terminal has established a communication connection. The neighboring cell is a cell neighboring to the serving cell or the camped cell.

Optionally, the cell selection information includes at least one of the following: cell barred indicators, information about a state of a reference signal muting function, or information about offsets of a cell selection threshold.

The cell barred indicator may indicate a state of the cell, to indicate whether the terminal can select the cell. For example, cellBarred in an LTE or NR system is a cell barred indicator. When cellBarred is Barred, it may indicate that the state of the cell is "barred", to indicate that the terminal cannot select the cell. When cellBarred is notBarred, it may indicate that the state of the cell is "not barred", to indicate that the terminal can select the cell. cellBarred is included in a system information block type 1 (e.g., systeminformation-blocktype1, SIB 1, etc.) in the LTE system. It should be noted that cellBarred in the prior art is not associated with the configuration parameter of the reference signal of the cell.

Optionally, the cell barred indicators may include a first barred indicator and a second barred indicator. The first barred indicator may indicate the state of the cell to a first-type terminal, to indicate whether the first-type terminal can select the cell. The second barred indicator may indicate the state of the cell to a second-type terminal, to indicate whether the second-type terminal can select the cell. The first-type terminal and the second-type terminal use different configuration parameters of the reference signal. Optionally, the second barred indicator may be further used to indicate the state of the cell to the first-type terminal, to indicate whether the first-type terminal can select the cell. For example, the second barred indicator is cellBarred in the SIB 1 in the LTE system, and the second-type terminal is a terminal that uses the CRS on an entire system bandwidth, for example, a terminal that has been deployed in a network before a CRS muting function is introduced into the system, that is, a terminal that does not support CRS muting. The first barred indicator may be a newly defined cell barred indicator, for example, defined as cellBarred-new. When cellBarred-new is Barred, the first-type terminal cannot select the cell. When cellBarred-new is notBarred, the first-type terminal can select the cell. The first-type terminal is a terminal that uses the CRS on a partial system bandwidth, for example, a terminal that is synchronously deployed in the network when the CRS muting function is introduced into the system, that is, a terminal that supports CRS muting. The cell is a cell corresponding to the first barred indicator and the second barred indicator. In this case, that the first-type terminal and the second-type terminal use different configuration parameters of the reference signal means that a configuration bandwidth, of the reference signal, that is used by the first-type terminal is the partial system bandwidth, and a configuration bandwidth, of the reference signal, that is used by the second-type terminal is the entire system bandwidth.

Optionally, the configuration parameter may include at least one of the following: a configuration bandwidth, configuration duration, or a configuration periodicity. The configuration bandwidth may be a bandwidth of the reference signal of the cell, the configuration duration may be duration for sending the reference signal of the cell, and the configuration periodicity may be a periodicity length for sending the reference signal of the cell. Herein, that the first-type terminal and the second-type terminal use different configuration parameters of the reference signal may be: For example, the configuration bandwidth, of the reference signal, that is used by the first-type terminal is 5 MHz, and the configuration bandwidth, of the reference signal, that is used by the second-type terminal is 20 MHz; or configuration duration, of the reference signal, that is used by the first-type terminal is 200 ms, and configuration duration, of the reference signal, that is used by the second-type terminal is 400 ms; or a configuration periodicity, of the reference signal, that is used by the first-type terminal is 200 ms, and a configuration periodicity, of the reference signal, that is used by the second-type terminal is 400 ms; and so on.

When the configuration parameter includes the configuration bandwidth, the first-type terminal may be a narrowband terminal or a terminal that supports partial bandwidth (PBW) communication, for example, a machine type communication (MTC) terminal or a 5G terminal, and the second-type terminal may be a non-narrowband terminal or a full-bandwidth terminal, that is, a terminal that performs communication on the entire system bandwidth.

It should be noted that the network device may transmit the reference signal based on the configuration parameter of the reference signal. For the network device, the configuration parameter of the reference signal may be understood as a transmit parameter. The terminal may receive the reference signal based on the configuration parameter of the reference signal. For the terminal, the configuration parameter of the reference signal may be understood as a receive parameter.

The reference signal is usually used by the terminal to measure a signal power or signal quality and perform channel estimation, and the terminal performs measurement and channel estimation through averaging on resource elements (RE) in a resource corresponding to the configuration parameter, of the reference signal, that is used by the terminal. Therefore, accuracy of measurement and channel estimation performed by the terminal based on the reference signal is not affected when a resource that is used to carry the reference signal and that corresponds to the configuration parameter, of the reference signal, that is used by the network device completely includes the resource that is used to carry the reference signal and that corresponds to the configuration parameter, of the reference signal, that is used by the terminal, specifically, when a configuration bandwidth, of the reference signal, that is used by the terminal is less than or equal to a configuration bandwidth, of the reference signal, that is used by the network device, or configuration duration, of the reference signal, that is used by the terminal is less than or equal to configuration duration, of the reference signal, that is used by the network device, or a configuration periodicity, of the reference signal, that is used by the terminal is greater than or equal to a configuration periodicity, of the reference signal, that is used by the network device. Results of measurement and channel estimation performed by the terminal based on the reference signal are not accurate when the resource that is used to carry the reference signal and that corresponds to the configuration parameter, of the reference signal, that is used by the network device does not completely include the resource that is used to carry the reference signal and that corresponds to the configuration parameter, of the reference signal, that is used by the terminal, specifically, when the configuration bandwidth, of the reference signal, that is used by the terminal is greater than the configuration bandwidth, of the reference signal, that is used by the network device, or the configuration duration, of the reference signal, that is used by the terminal is greater than the configuration duration, of the reference signal, that is used by the network device, or the configuration periodicity, of the reference signal, that is used by the terminal is less than the configuration periodicity, of the reference signal, that is used by the network device. For example, if the cell broadcasts that the system bandwidth of the cell is 20 MHz, and the cell sends the CRS on the 20 MHz bandwidth, accuracy of measurement and channel estimation performed by the second-type terminal is not affected. This is because the second-type terminal considers that the cell definitely sends the CRS on the 20 MHz bandwidth if the cell broadcasts the 20 MHz system bandwidth. After the CRS muting is introduced, the cell still broadcasts that the system bandwidth of the cell is 20 MHz, but the cell may send the CRS on a center bandwidth of only 1.4 MHz. In this case, because the second-type terminal always considers that the cell definitely sends the CRS on the system bandwidth that is broadcast by the cell, the second-type terminal performs measurement and channel estimation on the 20 MHz bandwidth. Because the bandwidth on which the terminal measures the CRS is different from the bandwidth used by the network device to actually send the CRS, measurement and channel estimation are inaccurate. However, a terminal supporting the center bandwidth of 1.4 MHz (that is, the first-type terminal) always performs measurement and channel estimation on the center bandwidth of 1.4 MHz by using the CRS. Therefore, no matter whether the cell broadcasts that the system bandwidth of the cell is 20 MHz or 1.4 MHz, measurement and channel estimation performed by the terminal are not affected. Therefore, when the cell selection information is associated with the configuration parameter of the reference signal of the network device, terminals supporting different reference signal configurations can be deployed in the network while accuracy of measurement and channel estimation performed by the terminals is ensured.

That the configuration parameter is the configuration bandwidth and the cell selection information includes the cell barred indicators is used as an example. When the configuration bandwidth of the reference signal of the network device is the system bandwidth of the cell, the cell barred indicators may specifically indicate whether the terminals can select the cell. When the configuration bandwidth of the reference signal is less than the system bandwidth of the cell, the cell barred information may include the first barred information and the second barred information. The first barred information may indicate that the first-type terminal can select the cell, and the second barred information may indicate that the second-type terminal cannot select the cell. Herein, it is assumed that the configuration bandwidth, of the reference signal, that is used by the first-type terminal is less than or equal to the configuration bandwidth of the reference signal of the network device, and the configuration bandwidth, of the reference signal, that is used by the second-type terminal is greater than or equal to the system bandwidth of the cell.

That the configuration parameter is the configuration duration and the cell selection information includes the cell barred indicators is used as an example. When the configuration duration of the reference signal of the network device is first duration, the cell barred indicators may specifically indicate whether the terminals can select the cell. When the configuration duration of the reference signal is second duration (where the second duration is less than the first duration), the cell barred information may include the first barred information and the second barred information. The first barred information may indicate that the first-type terminal can select the cell, and the second barred information may indicate that the second-type terminal cannot select the cell. Herein, it is assumed that the configuration duration, of the reference signal, that is used by the first-type terminal is less than or equal to the second duration, and the configuration duration, of the reference signal, that is used by the second-type terminal is greater than or equal to the first duration.

That the configuration parameter is the configuration periodicity and the cell selection information includes the cell barred indicators is used as an example. When the configuration duration of the reference signal of the network device is a first periodicity, the cell barred indicators may specifically indicate whether the terminals can select the cell. When the configuration duration of the reference signal is a second periodicity (where the second periodicity is greater than the first periodicity), the cell barred information may include the first barred information and the second barred information. The first barred information may indicate that the first-type terminal can select the cell, and the second barred information may indicate that the second-type terminal cannot select the cell. Herein, it is assumed that the configuration periodicity, of the reference signal, that is used by the first-type terminal is greater than or equal to the second periodicity, and the configuration periodicity, of the reference signal, that is used by the second-type terminal is less than or equal to the first periodicity.

It should be noted that, a relationship between the configuration parameter, of the reference signal, that is used by the first-type terminal and the configuration parameter of the reference signal of the network device may be specifically as follows: The resource that is used to carry the reference signal and that corresponds to the configuration parameter, of the reference signal, that is used by the network device completely includes a resource that is used to carry the reference signal and that corresponds to the configuration parameter, of the reference signal, that is used by the first-type terminal. For example, the configuration parameter, of the reference signal, that is used by the first-type terminal is the same as the configuration parameter, of the reference signal, that is used by the network device. A relationship between the configuration parameter, of the reference signal, that is used by the second-type terminal and the configuration parameter, of the reference signal, that is used by the network device may be specifically as follows: The resource that is used to carry the reference signal and that corresponds to the configuration parameter, of the reference signal, that is used by the network device does not completely include a resource that is used to carry the reference signal and that corresponds to the configuration parameter, of the reference signal, that is used by the second-type terminal.

Optionally, the configuration parameter, of the reference signal, that is used by the network device may be specifically determined based on the state of the reference signal muting function.

Optionally, the state of the reference signal muting function includes any one of the following: enabled, disabled, or unsupported. When the state of the reference signal muting function is "enabled", it may indicate that the network device has a capability of transmitting the reference signal based on a reference signal transmission requirement corresponding to the reference signal muting function, and the reference signal muting function has taken effect. The network device transmits the reference signal based on the reference signal transmission requirement corresponding to the reference signal muting function. When the state of the reference signal muting function is "disabled", it may indicate that the network device has the capability of transmitting the reference signal based on the reference signal transmission requirement corresponding to the reference signal muting function, but the reference signal muting function does not take effect. The network device does not transmit the reference signal based on the reference signal transmission requirement corresponding to the reference signal muting function. When the state of the reference signal muting function is "unsupported", it may indicate that the network device does not have the capability of transmitting the reference signal based on the reference signal transmission requirement corresponding to the reference signal muting function.

Optionally, a configuration bandwidth, of the reference signal, that is used by the network device when the state of the reference signal muting function is "disabled" or "unsupported" may be greater than a configuration bandwidth, of the reference signal, that is used by the network device when the state of the reference signal muting function is "enabled"; and/or configuration duration, of the reference signal, that is used by the network device when the state of the reference signal muting function is "disabled" or "unsupported" may be greater than configuration duration, of the reference signal, that is used by the network device when the state of the reference signal muting function is "enabled"; and/or a configuration periodicity, of the reference signal, that is used by the network device when the state of the reference signal muting function is "disabled" or "unsupported" may be less than a configuration periodicity, of the reference signal, that is used by the network device when the state of the reference signal muting function is "enabled".

Optionally, a value of the offset may also be determined based on the state of the reference signal muting function. Further, optionally, when the state of the reference signal muting function is "enabled", the offsets each may be a positive value or a negative value; or when the state of the reference signal muting function is "disabled" or "unsupported", the offsets each may be 0.

Optionally, the offsets include a first offset and a second offset; and the first offset is an offset, of the cell selection threshold, that is used by the first-type terminal, and the second offset is an offset, of the cell selection threshold, that is used by the second-type terminal. Further, optionally, when the state of the reference signal muting function is "enabled", the first offset may be a positive value, and the second offset may be a negative value; or when the state of the reference signal muting function is "enabled", the first offset may be a negative value, and the second offset may be a positive value. When the state of the reference signal muting function is "disabled" or "unsupported", either the first offset or the second offset may be 0.

Block 202: The network device sends the cell selection information.

In this block, the network device may send the cell selection information by broadcasting a system message. Optionally, when the cell is the serving cell, the cell selection information may be sent by using a system information block type 1 (SIB 1). For example, cellBarred in the prior art may be used as the second barred information, and cellBarred-new is added as the first barred information.

Optionally, the information about the state of the cell reference signal muting function of the neighboring cell may be included in a system information block type 4 (SIB 4) and a system information block type 5 (SIB 5). Specifically, the information about the state of the reference signal muting function of the cell is added to intra-frequency neighboring cell information (IntraFreqNeighCellInfo) in an intra-frequency neighboring cell list (IntraFreqNeighCellList) of the SIB 4. An extended inter-frequency neighboring cell list (interFreqNeighCellListExt) may be added in the SIB 5, and the information about the state of the reference signal muting function of the cell is added to extended inter-frequency neighboring cell information (InterFreqNeighCellInfoExt) in interFreqNeighCellListExt. One neighboring cell in interFreqNeighCellListExt corresponds to one piece of InterFreqNeighCellInfoExt. Optionally, a type of the newly added information about the state of the reference signal muting function of the cell may be a Boolean (BOOLEAN) type. For example, when the type is 1, it may indicate that the state is "enabled", and when the type is 0, it may indicate that the state is "disabled" or "unsupported".

It should be noted that the network device may alternatively send the cell selection information by using a message sent in another broadcast manner or a non-broadcast manner. This is not limited in this disclosure.

Block 203: The terminal receives the cell selection information sent by the network device.

In this block, the terminal may receive, by using the system message broadcast by the network device, the cell selection information sent by the network device. Optionally, when the cell is the serving cell, the cell selection information sent by the network device may be received by using the SIB 1. When the cell is the neighboring cell, the cell selection information sent by the network device may be received by using the SIB 4 or the SIB 5.

It should be noted that the terminal may receive specific information that should be used by the terminal and that is in the cell selection information sent by the network device. The specific information may be some or all information in the cell selection information. This is not limited in this disclosure. Optionally, when the terminal is the first-type terminal, the terminal may receive the first barred information and/or the second barred information sent by the network device. When the terminal is the second-type terminal, the terminal may receive the second barred information sent by the network device. Optionally, when the terminal is the first-type terminal, the terminal may receive the information, about the first offset, that is sent by the network device. When the terminal is the second-type terminal, the terminal may receive the information, about the second offset, that is sent by the network device.

Block 204: The terminal performs cell selection based on the cell selection information.

In this block, the terminal should perform cell selection based on the cell selection information. It should be noted that the cell selection information does not necessarily indicate the terminal to immediately perform cell selection, but the terminal is to use the cell selection information in a cell selection process. The cell selection process may be triggered in another manner. This is not limited in this disclosure.

Optionally, when the cell selection information includes the cell barred indicator, block 204 may specifically include: If the cell barred indicator indicates that the state of the cell is "not barred", the terminal can select the cell during cell selection; or if the cell barred indicator indicates that the state of the cell is "barred", the terminal cannot select the cell during cell selection. Further, if the first barred information indicates that the state of the cell is "not barred", the first-type terminal can select the cell during cell selection; or if the first barred information indicates that the state of the cell is "barred", the first-type terminal cannot select the cell during cell selection. If the second barred information indicates that the state of the cell is "not barred", the second-type terminal can select the cell during cell selection; or if the second barred information indicates that the state of the cell is "barred", the second-type terminal cannot select the cell during cell selection.

Optionally, the first-type terminal may specifically implement block 204 by using the following two methods:

Method 1: The first-type terminal ignores the second barred indicator, and the first-type terminal determines the state of the cell based on the first barred indicator. The second-type terminal ignores the first barred indicator. Specifically, if the first barred indicator is Barred, the first-type terminal may determine that the cell is barred, and cannot select the cell during cell selection. If the first barred indicator is notBarred, the first-type terminal may determine that the cell is not barred, and can select the cell during cell selection (that is, the cell may be used as a candidate cell).

Method 2: The first-type terminal determines the state of the cell based on the second barred indicator. Specifically, if the second barred indicator is Barred, the first-type terminal may further determine the state of the cell based on the first barred indicator. Further, if the first barred indicator is Barred, the first-type terminal may determine that the cell is barred, and cannot select the cell. If the first barred indicator is notBarred, the first-type terminal may determine that the cell is not barred, and the cell may be used as a candidate cell. If the second barred indicator is notBarred, the first-type terminal may determine that the cell is not barred, and the cell may be used as a candidate cell.

Optionally, the second-type terminal may specifically implement block 204 by using the following method: If the second barred indicator is Barred, the second-type terminal determines that the cell is barred, and does not select the cell; if the second barred indicator is notBarred, the second-type terminal determines that the cell is not barred, and the cell may be used as a candidate cell.

That the first-type terminal implements block 204 by using the foregoing Method 2 is used as an example. Optionally, for a cell that does not support reference signal muting, the network device may set cellbarred to notBarred, that is, allow the first-type terminal and the second-type terminal to select the cell. For a cell that supports reference signal muting, the network device may set cellBarred to Barred, and the second-type terminal reads cellBarred and does not select the cell. The first-type terminal ignores cellBarred, and reads the first barred indicator.

When the configuration parameter, of the reference signal, that is used by the network device is the same as the configuration parameter, of the reference signal, that is used by the first-type terminal, the first barred indicator indicates, to the first-type terminal, that the state of the cell is "not barred", and the second barred indicator indicates, to the second-type terminal, that the state of the cell is "barred". In this way, the first-type terminal can access, select, or camp on the cell, and the second-type terminal does not access, select, or camp on the cell. This avoids a problem that results of measurement and channel estimation performed by the second-type terminal based on the reference signal are inaccurate.

Optionally, when the cell selection information includes the information about the state of the reference signal muting function of the cell, block 204 may specifically include: The terminal determines, based on the state of the reference signal muting function of the cell, whether the cell can be selected. Optionally, if the state of the reference signal muting function of the cell is disabled or unsupported, the terminal can select the cell during cell selection; if the state of the reference signal muting function of the cell is enabled, the first-type terminal can select the cell during cell selection, and the second-type terminal does not select the cell during cell selection.

Optionally, when the terminal is the first-type terminal, that terminal determines, based on the state of the reference signal muting function of the cell, whether the cell can be selected may specifically include: The terminal adds the cell to a cell selection whitelist if the state of the reference signal muting function of the cell is "enabled"; or the terminal adds the cell to a cell selection whitelist if the state of the reference signal muting function of the cell is "disabled" or "unsupported"; or the terminal adds the cell to a cell selection blacklist if the state of the reference signal muting function of the cell is "disabled" or "unsupported".

Optionally, when the terminal is the second-type terminal, that terminal determines, based on the state of the reference signal muting function of the cell, whether the cell can be selected may specifically include: The terminal adds the cell to a cell selection blacklist if the state of the reference signal muting function of the cell is "enabled"; or the terminal adds the cell to a cell selection whitelist if the state of the reference signal muting function of the cell is "disabled" or "unsupported".

Optionally, when the cell is the serving cell, and the terminal adds the cell to the cell selection blacklist, cell selection may be triggered again.

When the state of the reference signal muting function of the cell is enabled, the second-type terminal adds the cell to the cell selection blacklist. This avoids the problem that the results of measurement and channel estimation performed by the second-type terminal based on the reference signal are inaccurate.

Optionally, when the cell selection information includes the information about the offsets, block 204 may specifically include: The terminal calculates a parameter in a cell selection criterion based on the offset, and performs cell selection by using the parameter. Optionally, before the terminal calculates the parameter in the cell selection criterion based on the offset, block 204 further includes: The terminal determines, based on the state of the reference signal muting function of the cell, whether to use the offset to calculate the parameter in the cell selection criterion. Optionally, assuming that the terminal is the first-type terminal, when the state of the reference signal muting function of the cell is "enabled", the terminal calculates the parameter in the cell selection criterion by using the offset; when the state of the reference signal muting function of the cell is "disabled" or "unsupported", the terminal calculates the parameter in the cell selection criterion by using the offset; when the state of the reference signal muting function of the cell is "disabled" or "unsupported", the terminal calculates the parameter in the cell selection criterion without using the offset. Assuming that the terminal is the second-type terminal, when the state of the reference signal muting function of the cell is "enabled", the terminal calculates the parameter in the cell selection criterion without using the offset; when the state of the reference signal muting function of the cell is "disabled" or "unsupported", the terminal calculates the parameter in the cell selection criterion by using the offset. It should be noted that, when the offset is determined based on the state of the reference signal muting function of the cell, the terminal may not determine, based on the state of the reference signal muting function of the cell, whether to use the offset to calculate the parameter in the cell selection criterion, but directly calculates the parameter in the cell selection criterion by using the offset.

It should be noted that the cell selection criterion may include an initial cell selection criterion and/or a cell reselection criterion.

Optionally, that the terminal calculates the parameter in the cell selection criterion based on the offset may specifically include:

When the cell is the serving cell, the terminal calculates a parameter $R_s$ in the cell selection criterion based on the offset Qoffset1, and the calculation meets the following formula (1):

$$R_s = Q_{meas,\,s} + Q\text{offset1} + Q\text{temp1} \qquad \text{Formula (1)}$$

Qtemp1 may represent another offset, and $Q_{meas,\,s}$ may represent a reference signal received power (RSRP) or reference signal received quality (RSRQ) of the serving cell.

Optionally, Qtemp1 may specifically include at least one or more of $Q_{Hyst}$, Qoffset$_{temp}$, and Qoffset$_{SCPTM}$, where $Q_{Hyst}$ may represent a compensation for hysteresis, Qoffset$_{temp}$ may represent a temporary offset, and Qoffset$_{SCPTM}$ may represent a temporary offset applied to a single-cell point-to-multipoint (SC-PTM) frequency.

When Qtemp1 includes $Q_{Hyst}$, Qoffset$_{temp}$, and Qoffset$_{SCPTM}$, the terminal calculates the parameter $R_s$ in the cell selection criterion based on the offset Qoffset1, and the calculation meets the following formula (2):

$$R_s = Q_{meas,\,s} + Q_{Hyst} - Q\text{offset}_{temp} + Q\text{offset}_{SCPTM} + Q\text{offset1} \qquad \text{Formula (2)}$$

When the cell is the neighboring cell, the terminal calculates a parameter $R_n$ in the cell selection criterion based on the offset Qoffset1, and the calculation meets the following formula (3):

$$R_n = Q_{meas,\,n} + Q\text{offset1} + Q\text{temp2} \qquad \text{Formula (3)}$$

Qtemp2 may represent another offset, and $Q_{meas,\,n}$ may represent an RSRP or RSRQ of the neighboring cell.

Optionally, Qtemp2 may specifically include at least one or more of Qoffset, Qoffset$_{temp}$, and Qoffset$_{SCPTM}$, where Qoffset may represent Qoffset$_{s,\,n}$ or Qoffset$_{s,\,n}$ Qoffset$_{frequency}$, Qoffset$_{temp}$ may represent a temporary offset, and Qoffset$_{SCPTM}$ may represent a temporary offset applied to an SC-PTM frequency.

When Qtemp2 includes Qoffset, Qoffset$_{temp}$, and Qoffset$_{SCPTM}$, the terminal calculates the parameter $R_n$ in the cell selection criterion based on the offset Qoffset1, and the calculation meets the following formula (4):

$$R_n = Q_{meas,\,n} - Q\text{offset} - Q\text{offset}_{temp} + Q\text{offset}_{SCPTM} + Q\text{offset1} \qquad \text{Formula (4)}$$

It should be noted that, an example in which the offset is a positive value is used in the formula (1) to the formula (4). It should be noted that values of Qtemp1 and Qtemp2 may alternatively be 0.

It should be noted that, when the terminal calculates the parameter in the cell selection criterion without using the offset, it may be understood as that the value of Qoffset1 in formula (1) and formula (2) is 0.

Optionally, when the terminal is the first-type terminal, block 204 may specifically include: The terminal calculates the parameter in the cell selection criterion based on the first offset, and performs cell selection based on the parameter. When the terminal is the second-type terminal, block 204 may specifically include: The terminal calculates the parameter in the cell selection criterion based on the second offset, and performs cell selection based on the parameter. It should be noted that, for a specific manner in which the terminal calculates the parameter in the cell selection criterion based on the first offset or the second offset, refer to the foregoing formula (1) or formula (2). Details are not described herein again.

It should be noted that the cell selection criterion may also be referred to as an R criterion.

The terminal calculates the parameter in the cell selection criterion based on the offset, and performs cell selection by using the parameter, so that the first-type terminal tends to select a cell whose reference signal muting function is enabled, and the second-type terminal tends to select a cell whose reference signal muting function is disabled or unsupported.

In this embodiment, the network device generates and sends the cell selection information associated with the configuration parameter of the reference signal of the cell, and the terminal receives the cell selection information sent by the network device and performs cell selection based on the cell selection information. In this way, terminals supporting different reference signal configurations can be deployed in the network.

Figure 3:
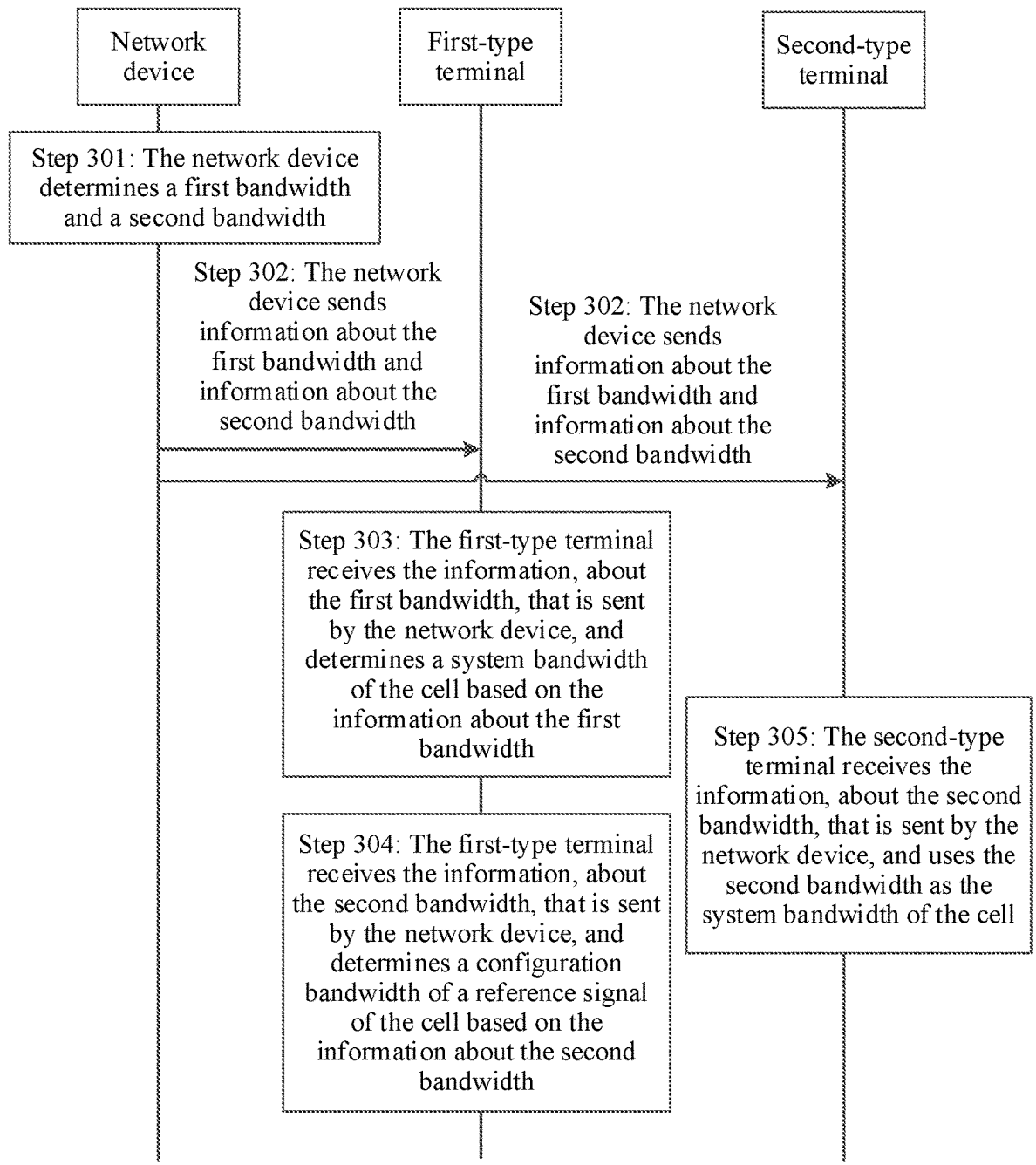
FIG. 3 is a flowchart of a second embodiment of a communications method according to an embodiment of this disclosure.

FIG. 3 is a flowchart of a second embodiment of a communications method according to an embodiment of this disclosure. As shown in FIG. 3, the method in this embodiment may include the following blocks.

Block 301: A network device determines a first bandwidth and a second bandwidth.

In this block, the first bandwidth is a system bandwidth of a cell, and the second bandwidth is a configuration bandwidth of a reference signal of the cell. Optionally, the configuration bandwidth of the reference signal of the cell may be less than or equal to the system bandwidth of the cell.

Optionally, the configuration bandwidth of the reference signal of the cell may be a transmit bandwidth configured for the reference signal of the cell.

Block 302: The network device sends information about the first bandwidth and information about the second bandwidth.

In this block, the information about the first bandwidth is used to indicate the first bandwidth, and may be specifically a value of the first bandwidth. The information about the second bandwidth is used to indicate the second bandwidth, and may be specifically a value of the second bandwidth. The network device may send the information about the first bandwidth and the information about the second bandwidth by broadcasting a system message.

Optionally, the network device may send the information about the first bandwidth and the information about the second bandwidth by using a master information block (MIB). Specifically, a downlink bandwidth (dl-Bandwidth) in the MIB in the prior art may be used as the information about the second bandwidth, and an extended downlink bandwidth (dl-BandwidthExt) is added to the master information block as the information about the first bandwidth. Alternatively, an extended downlink bandwidth (dl-BandwidthExt) may be added to an SIB 1 as the information about the second bandwidth.

It should be noted that the network device may alternatively send the cell selection information by using a message sent in another broadcast manner or a non-broadcast manner. This is not limited in this disclosure.

Block 303: A first-type terminal receives the information, about the first bandwidth, that is sent by the network device, and determines the system bandwidth of the cell based on the information about the first bandwidth.

In this block, specifically, the first-type terminal may determine the system bandwidth of the cell based on the information about the first bandwidth. A relationship between the system bandwidth of the cell and a configuration bandwidth, of the reference signal, that is used by the first-type terminal is different from that between the system bandwidth of the cell and a configuration bandwidth, of the reference signal, that is used by the following second-type terminal. Optionally, the configuration bandwidth, of the reference signal, that is used by the first-type terminal may be a partial bandwidth in the system bandwidth, of the cell, that is determined by the first-type terminal, and the first-type terminal may be, for example, the foregoing narrowband terminal or a terminal that supports partial bandwidth communication. The configuration bandwidth, of the reference signal, that is used by the second-type terminal may be the entire system bandwidth, of the cell, that is determined by the second-type terminal, and the second-type terminal may be, for example, the foregoing non-narrowband terminal or full-bandwidth terminal.

Optionally, this embodiment may alternatively include the following block 304:

Block 304: The first-type terminal receives the information, about the second bandwidth, that is sent by the network device, and determines the configuration bandwidth of the reference signal of the cell based on the information about the second bandwidth.

In this block, the first-type terminal may determine the configuration bandwidth of the reference signal of the cell based on the information about the second bandwidth. Herein, the first-type terminal determines the configuration bandwidth of the reference signal of the cell based on the information about the second bandwidth, so that the configuration bandwidth of the reference signal of the cell is more flexible.

Block 305: The second-type terminal receives the information, about the second bandwidth, that is sent by the network device, and uses the second bandwidth as the system bandwidth of the cell.

In this block, the reference signal is usually used by the terminal to measure a signal power or signal quality and perform channel estimation, and the terminal performs measurement and channel estimation through averaging on REs in a resource corresponding to the configuration parameter, of the reference signal, that is used by the terminal. Therefore, accuracy of measurement and channel estimation performed by the terminal based on the reference signal is not affected when the configuration bandwidth, of the reference signal, that is used by the terminal is less than or equal to the configuration bandwidth, of the reference signal, that is used by the network device. When the configuration bandwidth, of the reference signal, that is used by the terminal is greater than the configuration bandwidth, of the reference signal, that is used by the network device, results of measurement and channel estimation performed by the terminal based on the reference signal are inaccurate. For example, it is assumed that the cell broadcasts that the system bandwidth of the cell is 20 MHz, but the cell may send a CRS on a center bandwidth of only 1.4 MHz. In this case, because the second-type terminal always considers that the cell definitely sends the CRS on the system bandwidth that is broadcast by the cell, the second-type terminal performs measurement and channel estimation on the 20 MHz bandwidth. Because the bandwidth on which measurement is performed is different from the bandwidth used to actually send the CRS, measurement and channel estimation are inaccurate. However, a terminal supporting the center bandwidth of 1.4 MHz (that is, the first-type terminal) always performs measurement and channel estimation on the center bandwidth of 1.4 MHz by using the CRS. Therefore, no matter whether the cell broadcasts that the system bandwidth of the cell is 20 MHz or 1.4 MHz, measurement and channel estimation performed by the terminal are not affected. In this embodiment, the second-type terminal receives the information, about the second bandwidth, that is sent by the network device, and uses the second bandwidth as the system bandwidth of the cell, where the second bandwidth is the configuration bandwidth of the reference signal of the cell, so that the bandwidth on which the second-type terminal measures the CRS matches the bandwidth used by the network device to actually send the CRS. In this way, terminals supporting different reference signal configurations can be deployed in a network while accuracy of measurement and channel estimation performed by the terminals is ensured.

It should be noted that a sequence of performing block 303, block 304, and block 305 is not limited.

In this embodiment, the network device sends the information about the first bandwidth and the information about the second bandwidth. The first bandwidth is the system bandwidth of the cell, the second bandwidth is the configuration bandwidth of the reference signal of the cell. The first-type terminal receives the information, about the first bandwidth, that is sent by the network device, and determines the system bandwidth of the cell based on the information about the first bandwidth. The second-type terminal receives the information, about the second bandwidth, that is sent by the network device, and uses the second bandwidth as the system bandwidth of the cell. In this way, the terminals supporting different reference signal configurations can be deployed in the network while the accuracy of measurement and channel estimation performed by the terminals is ensured. In addition, the first-type terminal receives the information, about the second bandwidth, that is sent by the network device, and determines the configuration bandwidth of the reference signal of the cell based on the information about the second bandwidth, so that the configuration bandwidth of the reference signal of the cell is more flexible.

Figure 4:
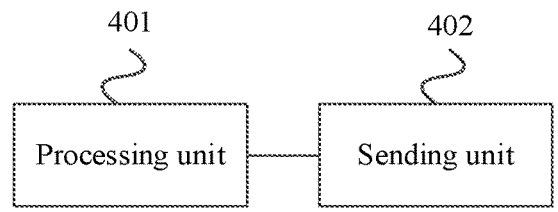
FIG. 4 is a first schematic structural diagram of a communications device according to an embodiment of this disclosure.

FIG. 4 is a first schematic structural diagram of a communications device according to an embodiment of this disclosure. As shown in FIG. 4, the communications device provided in this embodiment may include a processing unit 401 and a sending unit 402.

The processing unit 401 is configured to generate cell selection information, where the cell selection information is associated with a configuration parameter of a reference signal of a cell; and the sending unit 402 is configured to send the cell selection information generated by the processing unit 401.

The cell selection information is used by a terminal to perform cell selection.

Optionally, the cell selection information includes at least one of the following:

cell barred indicators, information about a state of a reference signal muting function, or information about offsets of a cell selection threshold.

Optionally, the cell barred indicators include a first barred indicator and a second barred indicator; and the first barred indicator is used to indicate whether a first-type terminal can select the cell, the second barred indicator is used to indicate whether a second-type terminal can select the cell, and the first-type terminal and the second-type terminal use different configuration parameters of the reference signal.

Optionally, the state of the reference signal muting function includes any one of the following: enabled, disabled, or unsupported.

Optionally, the offsets include a first offset and a second offset; and the first offset is an offset, of the cell selection threshold, that is used by the first-type terminal, the second offset is an offset, of the cell selection threshold, that is used by the second-type terminal, and the first-type terminal and the second-type terminal use different configuration parameters of the reference signal.

Optionally, the configuration parameter includes at least one of the following:

a configuration bandwidth, configuration duration, or a configuration periodicity.

Optionally, the cell includes a serving cell and/or a neighboring cell.

The communications device in this embodiment may be configured to execute the technical solution on the network device side in the embodiment shown in FIG. 2. Their implementation principles and technical effects are similar, and details are not described herein again.

Figure 5:
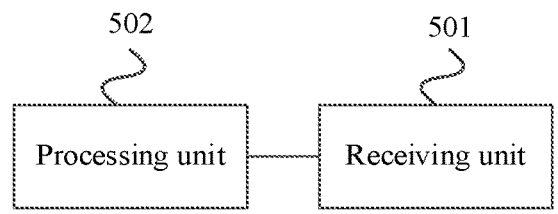
FIG. 5 is a second schematic structural diagram of a communications device according to an embodiment of this disclosure.

FIG. 5 is a second schematic structural diagram of a communications device according to an embodiment of this disclosure. As shown in FIG. 5, the communications device provided in this embodiment may include a receiving unit 501 and a processing unit 502.

The receiving unit 501 is configured to receive cell selection information sent by a network device, where the cell selection information is associated with a configuration parameter of a reference signal of a cell; and the processing unit 502 is configured to perform cell selection based on the cell selection information received by the receiving unit 501.

The cell selection information is used by a terminal to perform cell selection.

Optionally, the cell selection information includes at least one of the following:

cell barred indicators, information about a state of a reference signal muting function, or information about offsets of a cell selection threshold.

Optionally, that the receiving unit receives the cell selection information sent by the network device and the processing unit performs cell selection based on the cell selection information specifically includes:

The receiving unit receives a first barred indicator in the cell barred indicators sent by the network device, and the processing unit performs cell selection based on the first barred indicator; and/or the receiving unit receives a second barred indicator in the cell barred indicators sent by the network device, and the processing unit performs cell selection based on the second barred indicator.

Optionally, the cell selection information includes the information about the state of the reference signal muting function, and the state of the reference signal muting function includes any one of the following: enabled, disabled, or unsupported.

Optionally, that the receiving unit receives the cell selection information sent by the network device and the processing unit performs cell selection based on the cell selection information specifically includes:

The receiving unit receives the information, about the state of the reference signal muting function, that is sent by the network device, and the processing unit determines, based on the state of the reference signal muting function, whether the cell can be selected.

Optionally, the cell selection information includes the information about the offsets of the cell selection threshold, and that the receiving unit receives the cell selection information sent by the network device and the processing unit performs cell selection based on the cell selection information specifically includes:

The receiving unit receives the information, about the offset of the cell selection threshold, that is sent by the network device, and the processing unit calculates a parameter in a cell selection criterion based on the offset, and performs cell selection by using the parameter.

Optionally, the cell is a serving cell, and that the processing unit calculates the parameter in the cell selection criterion based on the offset specifically includes:

The processing unit calculates a parameter $R_s$ in the cell selection criterion based on the offset Qoffset1, where the calculation meets the following formula (1):

$$R_s = Q_{meas, s} + Q\text{offset1} + Q\text{temp1} \quad \text{Formula (1)}$$

$Q_{meas, s}$ represents a reference signal received power or reference signal received quality of the serving cell, and Qtemp1 represents another offset.

In an implementable design, the cell is a neighboring cell, and that the processing unit calculates the parameter in the cell selection criterion based on the offset specifically includes:

The processing unit calculates a parameter $R_n$ in the cell selection criterion based on the offset Qoffset1, where the calculation meets the following formula (3):

$$R_n = Q_{meas, n} + Q\text{offset1} + Q\text{temp2} \quad \text{Formula (3)}$$

$Q_{meas, s}$ represents a reference signal received power or reference signal received quality of the neighboring cell, and Qtemp2 represents another offset.

Optionally, the offsets include a first offset and a second offset; and that the receiving unit receives the cell selection information sent by the network device and the processing unit performs cell selection based on the cell selection information specifically includes: The receiving unit receives information that is about the first offset or the second offset and that is sent by the network device, and the processing unit calculates the parameter in the cell selection criterion based on the first offset or the second offset, and performs cell selection by using the parameter.

The communications device in this embodiment may be configured to execute the technical solution on the terminal side in the embodiment shown in FIG. 2. Their implementation principles and technical effects are similar, and details are not described herein again.

An embodiment of this disclosure further provides a communications device. A structure of the communications device is the same as the structure of the communications device shown in FIG. 4, and the communications device may also include a processing unit and a sending unit. The processing unit is configured to determine a first bandwidth and a second bandwidth, where the first bandwidth is a system bandwidth of a cell, and the second bandwidth is a configuration bandwidth of a reference signal of the cell; and the sending unit is configured to send information about the first bandwidth and information about the second bandwidth.

The communications device in this embodiment may be configured to execute the technical solution on the network device side in the embodiment shown in FIG. 3. Their implementation principles and technical effects are similar, and details are not described herein again.

An embodiment of this disclosure further provides a communications device. A structure of the communications device is the same as the structure of the communications device shown in FIG. 5, and the communications device may also include a receiving unit and a processing unit. The receiving unit is configured to receive information about a first bandwidth and information about a second bandwidth that are sent by a network device, where the first bandwidth is a system bandwidth of a cell, and the second bandwidth is a configuration bandwidth of a reference signal of the cell; the processing unit is configured to determine the system bandwidth of the cell based on the information about the first bandwidth; and the processing unit is further configured to determine the configuration bandwidth of reference signal of the cell.

The communications device in this embodiment may be configured to execute the technical solution on the terminal side in the embodiment shown in FIG. 3. Their implementation principles and technical effects are similar, and details are not described herein again.

It should be understood that, division into the units of the foregoing communications devices is merely logical function division, and during actual implementation, the units may be all or partially integrated into a physical entity, or may be physically separated. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be an independently disposed processing element, or may be integrated into a chip of a network device for implementation. In addition, the sending unit may alternatively be stored in a memory of a network device in a form of a program, and a processing element of the network device invokes and executes a function of the sending unit. Implementation of other units is similar. In addition, these units may be integrated together or may be individually implemented. The processing element may be an integrated circuit and has a signal processing capability. In an implementation process, blocks in the foregoing methods or the foregoing units can be implemented by using a hardware integrated logical circuit in the processing element, or by using instructions in a form of software. In addition, the sending unit is a sending control unit, and may receive information by using a transmit apparatus of the network device such as an antenna and a radio frequency apparatus.

The foregoing units may be configured as one or more integrated circuits for implementing the foregoing method, for example, one or more application-specific integrated circuits (ASIC), one or more microprocessors (such as a digital signal processor (DSP)), one or more field programmable gate arrays (FPGA), or the like. For another example, when one of the foregoing units is implemented by a processing element invoking a program, the processing element may be a general-purpose processor, such as a central processing unit (CPU) or another processor that can invoke a program. For another example, the units can be integrated together and implemented in a form of a system-on-a-chip (SOC).

Figure 6:
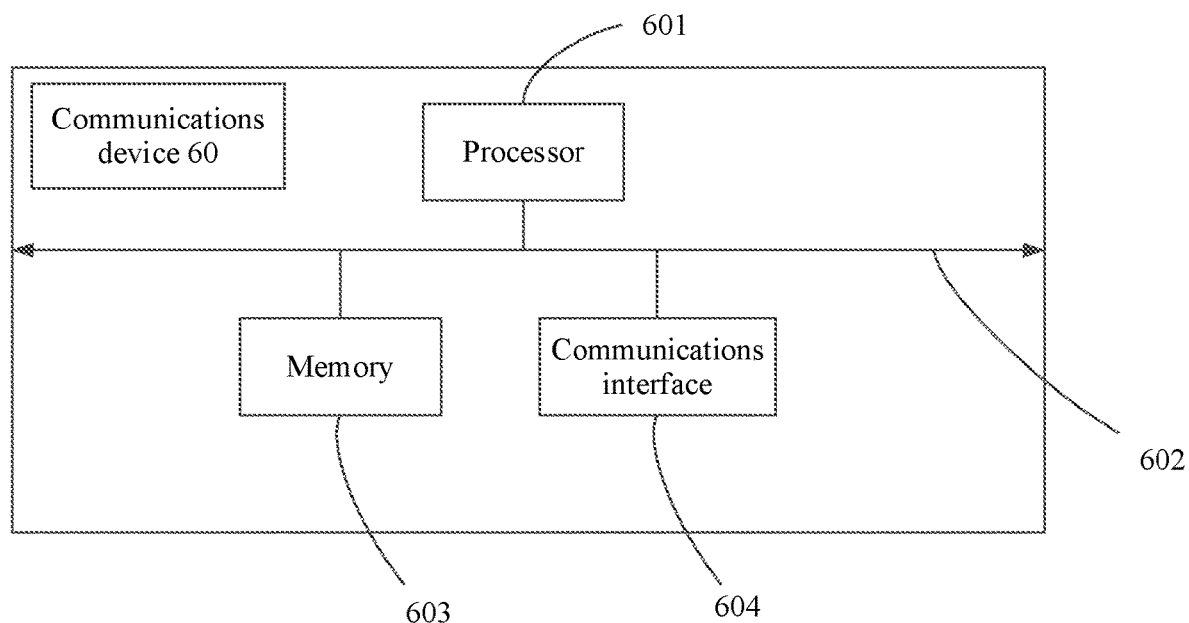
FIG. 6 is a schematic diagram of a hardware structure of a communications device according to an embodiment of this disclosure.

FIG. 6 is a schematic diagram of a hardware structure of a communications device according to an embodiment of this disclosure. The communications device 60 includes at least one processor 601, a communications bus 602, a memory 603, and at least one communications interface 604.

The processor 601 may be a general-purpose central processing unit (CPU), a microprocessor, an application-specific integrated circuit (ASIC), or one or more integrated circuits configured to control program execution of the solutions in this disclosure.

The communications bus 602 may include a path for transmitting information between the foregoing components.

The communications interface 604 is any apparatus like a transceiver, and is configured to communicate with another device or a communications network such as the Ethernet, a radio access network (RAN), or a wireless local area network (WLAN).

The memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 603 is not limited thereto. The memory may exist independently, and is connected to the processor by using a bus. The memory may alternatively be integrated with the processor.

The memory 603 is configured to store application program code for executing the solutions in this disclosure, and the processor 601 controls the execution. The processor 601 is configured to execute the application program code stored in the memory 603, to implement the communications method provided in the foregoing embodiments of this disclosure.

Alternatively, optionally, in this embodiment of this disclosure, the processor 601 may perform processing related functions in the communications method provided in the foregoing embodiments, and the communications interface 604 is responsible for communication with another device or a communications network. This is not specifically limited in this embodiment of this disclosure.

During specific implementation, in an embodiment, the processor 601 may include one or more CPUs.

During specific implementation, in an embodiment, the communications device 60 may include a plurality of processors. Each of the processors may be a single-core (single-CPU) processor, or may be a multi-core (multi-CPU) processor. The processor herein may be one or more devices, circuits, and/or processing cores for processing data (for example, a computer program instruction).

During specific implementation, in an embodiment, the communications device 60 may further include an output device and an input device. The output device communicates with the processor 601, and may display information in a plurality of manners. For example, the output device may be a liquid crystal display (LCD), a light emitting diode (LED) display device, a cathode ray tube (CRT) display device, a projector, or the like. The input device communicates with the processor 601, and may receive user input in a plurality of manners. For example, the input device may be a mouse, a keyboard, a touchscreen device, or a sensing device.

In addition, as described above, the communications device 60 provided in this embodiment of this disclosure may be a chip, a terminal, a network device, or a device with a structure similar to that in FIG. 6. A type of the communications device 60 is not limited in this embodiment of this disclosure.

In this embodiment, the communications device 60 is presented with the function modules implemented through integration. The "module" herein may be an application-specific integrated circuit (ASIC), a circuit, a processor executing one or more software or firmware programs, a memory, an integrated logic circuit, and/or another component that can provide the foregoing function. In a simple embodiment, a person skilled in the art may figure out that the communications device 60 may use the form shown in FIG. 6. For example, functions/implementation processes of the processing unit, the sending unit, and the receiving unit in FIG. 4 and FIG. 5 may be implemented by using the processor 601 and the memory 603 in FIG. 6. Specifically, the processing unit may be implemented by the processor 601 invoking the application program code stored in the memory 603. This is not limited in this embodiment of this disclosure. Alternatively, optionally, a function/an implementation process of the processing unit in FIG. 4 may be implemented by the processor 601 in FIG. 6. The sending unit in FIG. 4 may be implemented by using the communications interface 604 in FIG. 6. This is not limited in this embodiment of this disclosure.

It should be noted that the communications device provided in the embodiment shown in FIG. 6 may be specifically the network device in the embodiment shown in FIG. 2 or FIG. 3. When the processor 601 invokes the program stored in the memory 603, the method on the network device side provided in the embodiment shown in FIG. 2 or FIG. 3 may be performed.

It should be noted that the communications device provided in the embodiment shown in FIG. 6 may be specifically the terminal in the embodiment shown in FIG. 2 or FIG. 3. When the processor 601 invokes the program stored in the memory 603, the method on the terminal side provided in the embodiment shown in FIG. 2 or FIG. 3 may be performed.

Optionally, an embodiment of this disclosure further provides a communications system. The communications system may include the communications device shown in FIG. 6.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

What is claimed is:

1. A method, comprising:
generating, by a network device, cell selection information, wherein the cell selection information is associated with a configuration parameter of a reference signal of a cell, wherein the cell selection information comprises a first barred indicator and a second barred indicator, the first barred indicator is used to indicate whether a first-type terminal can select the cell, the second barred indicator is used to indicate whether a second-type terminal can select the cell; and
sending, by the network device, the cell selection information to a terminal, wherein the cell selection information is for the terminal performing cell selection, wherein the cell selection information is for the terminal performing cell selection comprises one or more of:
the first barred indicator in cell barred indicators is used by the terminal to perform cell selection; and
the second barred indicator in the cell barred indicators is used by the terminal to perform cell selection.

2. The method of claim 1, wherein:
the first-type terminal and the second-type terminal use different configuration parameters of the reference signal.

3. The method of claim 2, wherein:
the first-type terminal comprises a terminal that uses a cell-specific reference signal (CRS) on a partial system bandwidth or a terminal that supports CRS muting; and
the second-type terminal comprises a terminal that uses the CRS on an entire system bandwidth or a terminal that does not support CRS muting.

4. The method of claim 1, wherein the configuration parameter comprises a configuration bandwidth.

5. The method of claim 1, wherein the cell comprises a serving cell and/or a neighboring cell.

6. A method, comprising:
receiving, by a terminal, cell selection information from a network device, wherein the cell selection information is associated with a configuration parameter of a reference signal of a cell, wherein the cell selection information comprises a first barred indicator and a second barred indicator, the first barred indicator is used to indicate whether a first-type terminal can select the cell, the second barred indicator is used to indicate whether a second-type terminal can select the cell; and
performing, by the terminal, cell selection based on the cell selection information, wherein receiving the cell selection information from the network device and performing cell selection based on the cell selection information comprise one or more of:
receiving the first barred indicator in cell barred indicators from the network device, and performing cell selection based on the first barred indicator; and
receiving the second barred indicator in the cell barred indicators from the network device, and performing cell selection based on the second barred indicator.

7. An apparatus, comprising:
a memory storing program instructions; and
at least one processor coupled to the memory, wherein the program instructions, when executed by the at least one processor, cause the processor to:
generate cell selection information, wherein the cell selection information is associated with a configuration parameter of a reference signal of a cell, wherein the cell selection information comprises a first barred indicator and a second barred indicator, the first barred indicator is used to indicate whether a first-type terminal can select the cell, the second barred indicator is used to indicate whether a second-type terminal can select the cell; and
send the cell selection information to a terminal, wherein the cell selection information is for the terminal performing cell selection, wherein the cell selection information is for the terminal performing cell selection comprises one or more of:
the first barred indicator in cell barred indicators is used by the terminal to perform cell selection; and
the second barred indicator in the cell barred indicators is used by the terminal to perform cell selection.

8. The apparatus of claim 7, wherein:
the first-type terminal and the second-type terminal use different configuration parameters of the reference signal.

9. The apparatus of claim 8, wherein:
the first-type terminal comprises a terminal that uses a cell-specific reference signal (CRS) on a partial system bandwidth or a terminal that supports CRS muting; and
the second-type terminal comprises a terminal that uses the CRS on an entire system bandwidth or a terminal that does not support CRS muting.

10. The apparatus of claim 7, wherein the configuration parameter comprises a configuration bandwidth.

11. The apparatus of claim 7, wherein the cell comprises a serving cell and/or a neighboring cell.

12. The apparatus of claim 7, wherein the apparatus comprises a network device.

13. The method of claim 1, wherein the cell selection information further comprises a state of a reference signal muting function, and the state of the reference signal muting function includes any one of the following: enabled, disabled, or unsupported.

14. The method of claim 1, wherein the cell selection information further comprises information about offsets of a cell selection threshold, the offsets include a first offset and a second offset; and the first offset is an offset of the cell selection threshold, that is used by the first-type terminal, the second offset is an offset of the cell selection threshold, that is used by the second-type terminal.

15. The apparatus of claim 7, wherein the cell selection information further comprises a state of a reference signal muting function, and the state of the reference signal muting function includes any one of the following: enabled, disabled, or unsupported.

16. The apparatus of claim 7, wherein the cell selection information further comprises information about offsets of a cell selection threshold, the offsets include a first offset and a second offset; and the first offset is an offset of the cell selection threshold, that is used by the first-type terminal, the second offset is an offset of the cell selection threshold, that is used by the second-type terminal.

17. An apparatus, comprising:
a memory storing program instructions; and
at least one processor coupled to the memory, wherein the program instructions, when executed by the at least one processor, cause the processor to:
receive cell selection information from a network device, wherein the cell selection information is associated with a configuration parameter of a reference signal of a cell, wherein the cell selection information comprises a first barred indicator and a second barred indicator, the first barred indicator is used to indicate whether a first-type terminal can select the cell, the second barred indicator is used to indicate whether a second-type terminal can select the cell; and
perform cell selection based on the cell selection information, wherein receiving the cell selection information from the network device and performing cell selection based on the cell selection information comprise one or more of:
receiving the first barred indicator in cell barred indicators from the network device, and performing cell selection based on the first barred indicator; and
receiving the second barred indicator in the cell barred indicators from the network device, and performing cell selection based on the second barred indicator.

18. The apparatus of claim 17, wherein the program instructions, when executed by the at least one processor, further cause the processor to:
use a cell-specific reference signal (CRS) on a partial system bandwidth or support CRS muting; or
use the CRS on an entire system bandwidth or not support CRS muting.

19. The apparatus of claim 17, wherein the configuration parameter comprises a configuration bandwidth.

20. The method of claim 6, wherein the method further comprises:
using, by the terminal, a cell-specific reference signal (CRS) on a partial system bandwidth or supporting, by the terminal, CRS muting; or
using, by the terminal, the CRS on an entire system bandwidth or not supporting, by the terminal, CRS muting.

21. The method of claim 6, wherein the configuration parameter comprises a configuration bandwidth.

* * * * *